A. W. AYLING.
SANITARY CLEAN-OUT PLUG.
APPLICATION FILED NOV. 20, 1918.
1,436,331.
Patented Nov. 21, 1922.
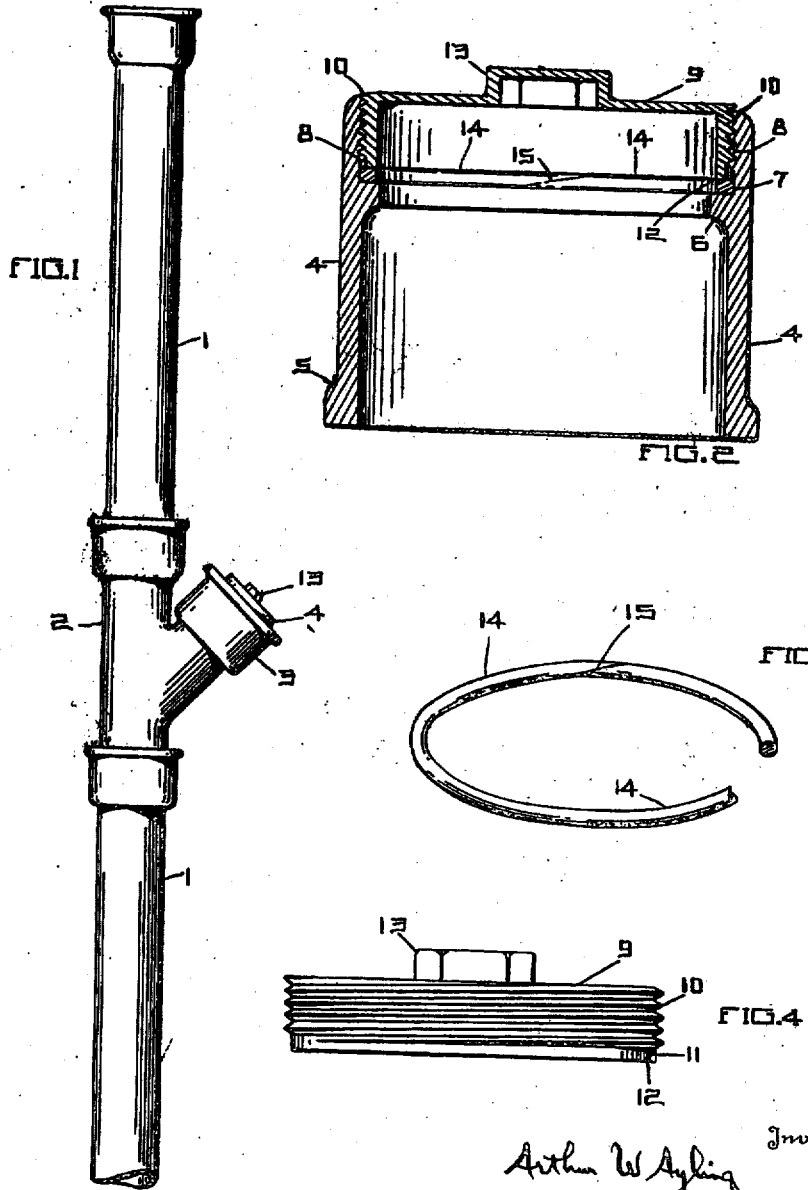

Patented Nov. 21, 1922.

1,436,331

UNITED STATES PATENT OFFICE.

ARTHUR W. AYLING, OF TOLEDO, OHIO.

SANITARY CLEAN-OUT PLUG.

Application filed November 20, 1918. Serial No. 263,360.

*To all whom it may concern:*

Be it known that I, ARTHUR W. AYLING, a citizen of the United States of America, residing at Toledo, Lucas County, Ohio, have invented new and useful Sanitary Clean-Out Plugs, of which the following is a specification.

This invention relates to self-packing fittings for gas and liquid tight joints which may be readily opened.

This invention has utility when incorporated in plugs, especially in sanitary installations for soil pipe clean out openings.

Referring to the drawings:

Fig. 1 is a view of an installation of soil pipe having a Y fitting therein equipped with a clean out plug in accordance with the invention herein;

Fig. 2 is a section through the special clean out fitting of Fig. 1, on an enlarged scale;

Fig. 3 is a perspective view of the circular formed leaden packing strip; and

Fig. 4 is a side elevation of the plug element of the fitting assembly unit.

The sewer waste or soil pipe 1 is provided with a branch or Y fitting 2, in the bell 3 of the arm of which may be sealed a pipe section or tubular member 4, say with oakum and lead for fluid tight connection, as coacting in the bell 3 with the ledge terminus 5 of the member 4.

The member 4 has spaced from its free end an interior endless ledge 6 on the side of a groove 7 away from such free end. Extending from such groove 7 to the free or open end of the member 4 is a straight or uniform threaded portion 8.

A closure member or plug 9 has an externally threaded portion 10, the threads of which are straight, or of uniform depth of cut throughout the thread extent, to an annular straight portion 11 adjacent the root of the threads 10 and in assembly opposing the straight bottom of the groove 7 adjacent the root of the threads 8. The plug 9 has its inner terminus 12 faced off square or flat. For loosening the plug 9 and moving it positively toward and from seating positions, a hexagonal head or projection 13 for wrench engagement is provided.

As a permanent gasket, a circular cross-section leaden wire or strip 14 may be formed with beveled interfitting or continuity preserving ends 15. This impressionable self-lubricating member 14 is placed on the ledge 6 adjacent the groove 7. As a gasket or packing, the member 14 is preferably of a dimension short of being flush with the ledge 6 inner projection, for then it is still less liable to wound or injury in working implements or tools through the member 4 in clean out, flushing or other operations.

In instances of sewer trouble or stoppage, quick action is essential and many times involves flooding and undesirable conditions, rendering trying any difficulties in removing a clean out plug. Furthermore the placing of the installation is naturally in a location normally given little attention and thus tending to accumulate corrosion, if not filth or dirt also. By making the member 9 herein of brass and the member 4 of iron, or brass there is ready freeing therebetween, especially with the threads 8, 10, straight or uniform, confining the wedging or binding action for packing the joint to the plug faces 11, 12, molding the leaden strip 14 snugly into the groove 7 with the ends 15 responding to the clockwise turning of the member 9 thereagainst in preserving ring continuity so effectively as to amount to almost total disappearance of the joint therebetween. The lead is a natural lubricant, as well as being impressionable between the more rigid brass and iron or steel. With the plug 9 set up against the packing 14 for a joint tight against the escape of liquid or sewer gas, a wrench engaging the portion 13 may effect ready freeing and the plug 9 thus is quickly removed with no difficulty. The work at the opening does not result in displacement or wounding of the gasket or packing 14. There is no element to replace, except the member 9, and in so doing the running up to firm holding position again brings the leaden member 14 into sealing action. The gasket or packing is permanent. The ledge 6 and groove 7 so co-operate with the opposing faces 12, 11 of the member 9, that the leaden member 14 is molded into a protected seat for retaining by the member 4.

What is claimed and it is desired to secure by Letters Patent is:

1. A clean-out fitting assembly for soil pipe calked connection comprising a cylindrical pipe member with a base flange as the sole exterior extension, said member having interiorly remote from the flange a shoulder providing a seat L-shaped in cross section and clear for self-cleaning over the edge of the base of the L-portion thereof, said cylindrical member being threaded interiorly from said shoulder to the adjacent terminus of the member, an exteriorly threaded plug for coacting with the thread of the member, and a lubricant providing gasket on said member seat to be engaged by the plug and shielded by the seat against displacement during plug removal and clean out operations.

2. A clean-out fitting assembly comprising a pipe member provided from one end with a uniform depth thread inward to a shoulder clear on the inner side to render it self-cleaning, a leaden strip on said shoulder, and a plug having uniform depth exterior threading coacting with the member threading to guide the plug into leaden strip compacting position in causing the leaden strip to act as a self lubricating seal seated against casual disturbance in plug removal and clean out operations.

In witness whereof I affix my signature.

ARTHUR W. AYLING.